March 5, 1968     M. BRESSLER     3,372,282

COLOR CODING OPTICAL RETICLE

Filed April 29, 1965

INVENTOR.
MARTIN BRESSLER
BY Edward O. Ansell
William E. Hiller
ATTORNEYS 3,372,282
COLOR CODING OPTICAL RETICLE
Martin Bressler, Covina, Calif., assignor to Aerojet-General Corporation, El Monte, Calif., a corporation of Ohio
Filed Apr. 29, 1965, Ser. No. 451,911
5 Claims. (Cl. 250—236)

ABSTRACT OF THE DISCLOSURE

This disclosure concerns a color coding optical reticle for an optical system useful in detecting and tracking sources of infrared radiation. The reticle comprises a circular base of light-transmitting material, such as quartz, having a planar surface, and a coating disposed on the planar surface of the base. The coating comprises a material having light-absorptive and light-transmitting qualities so as to transmit a particular range of light wavelengths therethrough while absorbing other light wavelengths falling outside of the range. One such suitable material for the coating is germanium which transmits light in the infrared part of the spectrum, while absorbing a high percentage of light occurring in the visible part of the spectrum. The coating is of a specific variable thickness enabling the reticle to act as an optical wedge, wherein light incident thereon produces linear interference fringes because of interference occurring in light reflected by the reticle. These linear interference fringes are indicative of the particular wavelengths of light to which the reticle is exposed. Upon rotating the reticle at a constant angular velocity, the linear interference fringes produced thereon code the light incident to the optical system and to the reticle forming a component thereof as a composite frequency signal which is converted to a variable electrical signal by a light detector in registration with the reticle. The variable electrical signal from the detector may be analyzed so as to separate and compare the various spectral constituents of the light incident to the optical system.

The present invention generally relates to a self-optimizing optical system of the type for identifying and tracking an infrared radiation emitting source. More particularly, the present invention relates to an optical component of such a system, wherein the component comprises a light coding device which takes the form of a rotary color coding reticle for effectively providing coding of incident light as a composite frequency signal such that the portion of the composite frequency signal corresponding to each spectral range can be thereafter separated or identified by suitable analyzing mechanisms.

An optical system for detecting and/or locating the source of infrared radiation emitted from a target object must be capable of satisfactorily distinguishing between the radiation emitted from the target object and the radiation from background effects. In the latter respect, the detection and/or tracking of aircraft targets against a background of sunlit clouds is likely to involve a problem in distinguishing false target signals derived from the sunlit clouds. Such false target signals are commonly referred to as background noise. Although the spectra of clouds and aircraft are considerably different, the intensity of a cloud on any particular portion of the spectrum can often be greater than that from an expected aircraft target and thus could yield a false target signal. Optical systems employing fixed filters to transmit radiation occurring only in a particular spectral region to a detector are limited by false target problems inasmuch as the raising of the threshold level of such optical systems to reduce the occurrence of false target signals also reduces the probability of correct target detection. Moreover, an optical system employing a fixed filter will obtain information as to the target signal-to-background noise ratio for only one spectral region.

It has also been proposed to construct a scanning radiometer for simultaneous measurements of the spatial characteristics of a background region or an extended target in each of a multiple number of narrow spectral regions. A mirror interferometer has been proposed for this purpose, but the relatively slow spectral scanning speed of the interferometer tends to limit the spatial scanning velocities that can be used, while the proposed interferometer is also mechanically limited by the fact that the mirror component thereof must be reciprocally driven by a relatively complex mechanical driving mechanism in synchronization with other components of the interferometer.

Accordingly, it is an object of the present invention to provide an improved self-optimizing optical system wherein the optical pass band thereof can be adjusted so as to maximize the ratio of target-to-background signals or otherwise minimize the effects of background by coding the incident light as a composite frequency signal to produce a corresponding electrical signal such that the portion of the electrical signal corresponding to each spectral region can be separated or identified.

It is another object of the present invention to provide a novel optical element comprising a light coding device in the form of a color coding reticle which may be rotated at a constant angular velocity in an optical detection and/or tracking system so as to be capable of obtaining target signal-to-background noise ratios for many spectral regions.

In its principal aspect, the present invention involves a light-coding device in the form of a rotatable color coding reticle which codes light incident to an optical system as a composite frequency signal such that the portion of the composite frequency signal corresponding to each spectral region in the incident light can be thereafter separated or identified. To this end, the color coding reticle relies upon the phenomenon that a series of linear interference fringes will be observed when monochromatic light is directed through a light-transmitting optical wedge. These interference fringes are due to the pathlength differences caused by multiple reflections between the interfaces provided by the optical wedge, the distance between the fringes being constant and being directly proportional to the wavelength of light in which they are observed. The spacing between adjacent fringes corresponds to an increase in the air gap of half a wavelength of light.

The color coding reticle is a form of an optical wedge in that it comprises a circular disc of light-transmitting material having a planar surface on which is disposed a coating of a material having light-transmitting and light-absorbing qualities such that a particular range of light wavelengths are transmittable therethrough, while other wavelengths falling outside of the range are absorbed thereby. The coating is spirally arranged about the planar surface of the circular base in at least one arcuate band which is of uniform axial thickness when measured along a radius of the circular base and of progressively increasing axial thickness when measured along successive radii of the circular base.

Upon directing a beam of monochromatic light through the color coding reticle while rotating the reticle at a constant angular velocity, a detector subsequently receiving the light will produce a varying electrical signal. The reticle modulates the light intensity at a constant frequency, and the varying electrical signal produced by the detector will have the same frequency. This electrical frequency is directly related (via the angular velocity of the reticle) to the inverse of wavelength, and therefore directly related to the wave number of the light.

If mixed or white light is directed through the color coding recticle, the modulations of all spectral components will be added together to produce a composite frequency signal, wherein the corresponding frequency components of the electrical signal produced by the detector can be thereafter separated or identified by suitable analyzing mechanisms. Thus, when the color coding reticle is viewed in mixed light, it comprises in effect a series of reticles, one for each resolvable spectral component and can be used with a simple detector to obtain the same information at the same rate as a series of fixed filter instruments.

Certain objects of the invention having been stated, other objects will become apparent from the following description when considered in conjunction with the accompanying drawings wherein.

Figure 1:
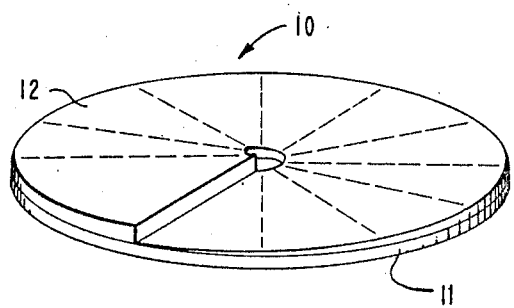
FIGURE 1 is a perspective view of a color coding reticle constructed in accordance with the present invention.

Referring more specifically to the drawings, a light coding device in accordance with the present invention is illustrated in FIGURE 1. The light coding device comprises a color coding reticle 10 which includes a circular base or disc 11 having planar front and rear surfaces. The circular base 11 is made of light-transmitting material which may be transparent, such as quartz for example. A coating 12 is applied to the forward planar surface of the circular base 11. The coating 12 comprises a material having light-absorptive and light-transmitting qualities so as to transmit a particular range of light wavelengths therethrough while absorbing other light wavelengths falling outside of the range. Where the color coding reticle 10 is to be used as a component of an optical system for detecting the source of infrared radiation emission, the coating 12 is preferably made of germanium which has the property of absorbing a high percentage of light occurring in the visible part of the spectrum, while transmitting a high percentage of light in the infrared part of the spectrum.

The coating 12 is disposed on the planar surface of the circular base 11 in the form of a spiral band which is of uniform axial thickness when measured along a radius of the circular base 11 and of progressively increasing axial thickness when measured along successive radii of the circular base 11. The coating 12 may therefore be characterized as a spiral inclined ramp which covers the forward planar surface of the circular base 11.

Figure 2:
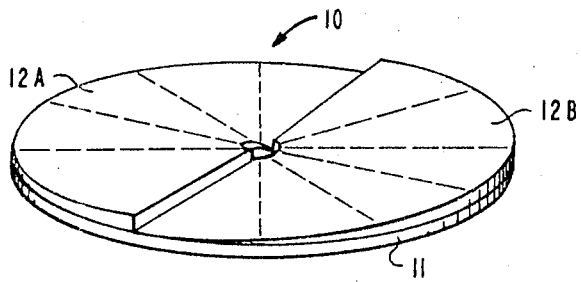
FIGURE 2 is a perspective view showing another embodiment of the color coding reticle.

Referring to FIGURE 2, another embodiment of the light coding device is illustrated in which the color coding reticle 10 comprises a circular base or disc 11 of light-transmitting material having front and rear planar surfaces, with a coating providing a pair of arcuate spiral inclined ramps 12A, 12B being disposed on the forward planar surface of the circular base 11. As in FIGURE 1, the circular base 11 may be quartz, and the coating may be of a material having light-absorptive and light transmitting qualities, such as germanium.

The pair of arcuate spiral inclined ramps 12A, 12B in the reticle 10 of FIGURE 2 are so disposed that each ramp spans an arc of 180° in covering the forward planar surface of the circular base 11. The ramps 12A and 12B are arranged in end-to-end relationship such that the end of ramp 12A having minimum axial thickness is adjacent the end of ramp 12B having maximum axial thickness.

The color coding reticle 10 of FIGURES 1 and 2 is provided with a central aperture for reception of a shaft therethrough which is to be rotated for imparting angular velocity to the reticle 10 carried thereby.

The germanium coating may be deposited on the quartz base or disc in forming the color coding reticle 10 of FIGURE 1 or FIGURE 2 by any suitable method, such as evaporating germanium onto the quartz disc within an evaporating chamber under vacuum conditions.

A contemplated third form of color coding reticle (not shown) similar to the reticles of FIGURE 1 and 2 could comprise a circular base having a forward planar surface on which a coating is disposed so as to provide a total of four arcuate ramps, wherein each ramp spans 90° of the forward planar surface of the circular base. In this instance, each pair of ramps covering 180° respectively of the forward planar surface of the circular base is arranged with the ramps in end-to-end relationship such that the ends of the ramps having maximum axial thickness are adjacent to each other. The ends of the ramps in one ramp pair having minimum axial thickness are adjacent the ends of the ramps in the other ramp pair having minimum axial thickness. Thus, the coating would have alternating ascending and descending inclined surfaces covering the full 360° of the circular base. The latter form of color coding reticle affords improved resolution as compared to the reticles shown in FIGURES 1 and 2.

Figure 3:
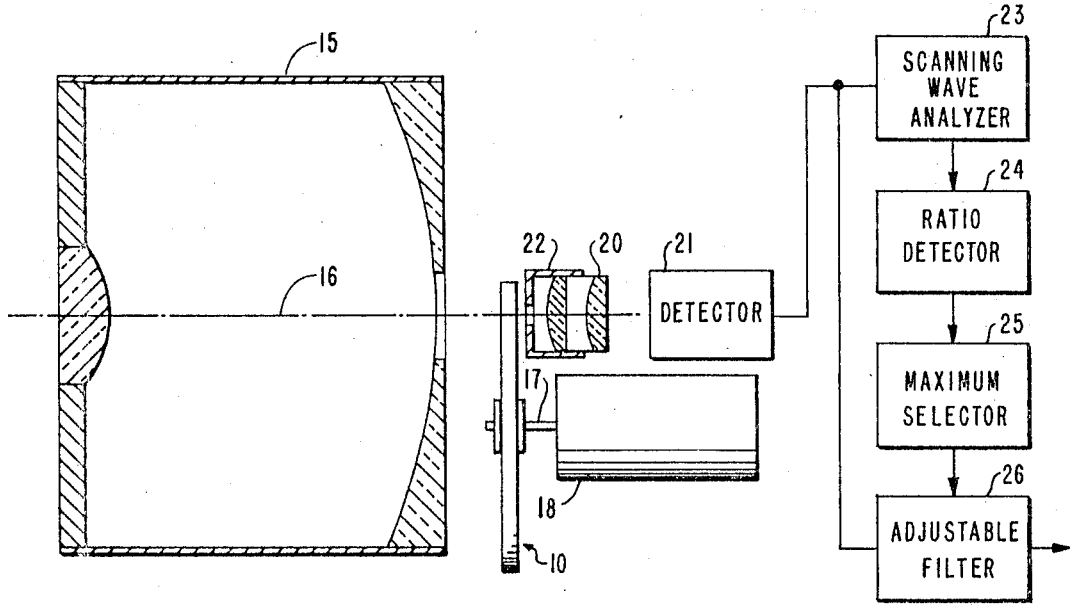
FIGURE 3 is a schematic view of an optical system employing the color coding reticle of FIGURE 1 or FIGURE 2 as a component thereof.

Referring to FIGURE 3, an optical system is illustrated schematically in which the color coding reticle 10 of either FIGURE 1, FIGURE 2, or described in the preceding paragraph is a component. As illustrated, the optical system comprises a lens assembly 15 for collecting light to be directed along the optical axis 16 of the optical system. The color coding rectile 10 is mounted on a shaft 17 having an axis parallel to but offset from the optical axis 16 of the optical system. The color coding reticle 10 is disposed perpendicular to the optical axis 16 so as to intersect the optical axis 16. The shaft 17 is rotated by a drive motor 18 so as to rotate the reticle 10 at a constant angular velocity in the focal plane of the lens assembly 15. Accordingly, the radiant image from a target object will be focused on the reticle 10.

A field lens in the form of a silicon doublet 20 is disposed on the optical axis 16 rearwardly of the reticle 10 and images the entrance aperture of the optical system on a detector 21. The field lens 20 is equipped with a field stop member 22 extending forwardly thereof and having an aperture lying on the optical axis 16 for defining a field of view. The detector 21 is connected in an electronic circuit including a scanning wave analyzer 23 for analyzing the electrical signals from the detector 21 which are produced by the wave forms generated from the reticle 10. The coded information from the scanning wave analyzer 23 is then directed to a wavelength ratio detector 24 which separates the coded information into responses in various wavelength regions and determines the ratio of target signal-to-background noise in each wavelength region. This information is thereafter directed to a ratio selector mechanism 25 which determines the wavelength region yielding the highest ratio of target signal-to-background noise. When the latter wavelength region has been selected by the maximum selector mechanism 25, this information is directed to an automatically adjustable filter 26 which is thereby adjusted to filter out all of the other wavelength regions initially fed into the scanning wave analyzer 23 from the detector 21.

Thereafter, the automatic setting of the adjustable filter 26 will determine the wavelength region of light transmitted from the detector 21 to a readout system or oscilloscope (not shown), wherein the detector 21 is effective to transmit signals corresponding to the wavelength region yielding the highest ratio of target signal-to-background noise in order to obtain maximum range capability for the optical system in detecting and tracking sources of infrared radiation.

In an optical system of the type described utilizing a color coding reticle in accordance with the present invention, the time required to analyze the frequency components of the composite frequency signal generated by the reticle 10 is extremely rapid and occurs almost simultaneously with measurement of the frequency components in the corresponding electrical signal produced by the detector 21 because the color coding reticle 10 can be rotated at high angular velocities. In the latter connection, as the speed of the color coding reticle 10 increases, the time period of the electrical signal produced from the detector 21 decreases, and the separation of frequency components on the frequency scale becomes greater. Accordingly, the band width of the scanning wave analyzer 23 used for measuring individual frequency components can be wider and the time it requires to scan through any given number of frequency components is therefore correspondingly shorter.

An optical system employing the color coding reticle in accordance with the present invention is also suitable as a surveillance apparatus, wherein the color coding reticle could be used to modulate the light incident on a focal plane array of detectors to eliminate false target problems and to simplify data handling and display, as for example, in searching for aircraft targets against a background of sunlit clouds. In a surveillance apparatus employing the color coding reticle, the electrical signal produced by each bright point contains frequency components directly related to the spectral constituents. By providing appropriate electronic circuits for each detector to separate and compare these frequency components, false targets can be eliminated on the basis of such spectral comparisons.

It is to be understood that the forms of the invention herewith shown and described are to be taken only as preferred examples of the same, and that various changes in the shape, size, and arrangement of the parts may be resorted to without departing from the spirit of this invention or the scope of the claims.

I claim:

1. A color coding optical reticle for producing linear interference fringes thereon from light incident thereto, wherein the linear interference fringes are indicative of light interference between light reflected from plural surfaces, said reticle comprising a circular base of light-transmitting material having a planar surface, a coating disposed on the planar surface of said base and comprising a material having light-absorptive and light-transmitting qualities so as to transmit a particular range of light wavelengths therethrough while absorbing other light wavelengths falling outside of the range, said coating comprising at least one arcuate band of uniform axial thickness when measured along a radius of said circular base and being of progressively increasing axial thickness when measured along successive radii of said circular base to define a spiral inclined ramp, said coating having an outer exposed surface comprising a first surface from which incident light is to be reflected, and said coating and said circular base defining an interface therebetween comprising a second surface from which incident light is to be reflected, whereby light reflected from said first and second surfaces produces linear interference fringes indicative of the particular wavelengths of light to which the reticle is exposed.

2. An optical reticle as defined in claim 1, wherein the light-transmitting material of said circular base comprises quartz, and the material of said coating comprises germanium.

3. An optical reticle as defined in claim 1, wherein said coating comprises a pair of arcuate bands, each of said arcuate bands spanning 180° of the planar surface of said circular base, and said arcuate bands being positioned in end-to-end relationship so as to cover the planar surface of said circular base to define a pair of spiral inclined ramps such that the end of one arcuate band having the minimum axial thickness of said one band is adjacent the end of the other arcuate band having the maximum axial thickness of said other arcuate band.

4. In an optical system for evaluating the characteristics of light incident thereto, a color coding reticle comprising a circular base of light-transmitting material having a planar surface, a coating disposed on the planar surface of said base and comprising a material having light-absorptive and light-transmitting qualities so as to transmit a particular range of light wavelengths therethrough while absorbing other light wavelengths falling outside of the range, said coating comprising at least one arcuate band of uniform axial thickness when measured along a radius of said circular base and being of progressively increasing axial thickness when measured along successive radii of said circular base to define a spiral inclined ramp, said coating having an outer exposed surface comprising a first surface from which incident light is to be reflected, and said coating and said circular base defining an interface therebetween comprising a second surface from which incident light is to be reflected, whereby light reflected from said first and second surfaces produces linear interference fringes indicative of the particular wavelengths of light to which the reticle is exposed, said color coding reticle being adapted to be disposed with its axis offset from the axis of the optical system but parallel thereto such that the color coding reticle is intersected by the axis of the optical system at a point on the color coding reticle located radially outwardly of the axis of the color coding reticle, and means for rotating said color coding reticle about its axis at a constant angular velocity, whereby the spiral inclined ramp formed by said coating of said color coding reticle is continuously moved through light rays travelling along the axis of the optical system such that the light intensity from the linear interference fringes produced on said color coding reticle is modulated at a constant frequency for producing a composite frequency signal.

5. A color coding optical reticle for producing linear interference fringes thereon from light incident thereto, wherein the linear interference fringes are indicative of light interference between light reflected from plural surfaces, said reticle comprising a circular base of light-transmitting material having a planar surface, a coating disposed on the planar surface of said base and comprising a material having light-absorptive and light-transmitting qualities so as to transmit a particular range of light wavelengths therethrough while absorbing other light wavelengths falling outside of the range, said coating comprising an even number of arcuate bands greater than two and having equal circumferential extents totalling 360° so as to span the planar surface of said circular base, each of said arcuate bands being of uniform axial thickness when measured along a radius of said circular base and being of progressively increasing axial thickness when measured along successive radii of said circular base to define a respective spiral inclined ramp, said arcuate bands being positioned in end-to-end relationship so as to cover the planar surface of said circular base such that the adjacent ends of successive arcuate bands alternately have the minimum axial thickness and the maximum axial thickness of said arcuate bands to define an alternating sequence of ascending and descending inclined ramps, said coating having an outer exposed surface comprising a first surface from which incident light is to be reflected, and said coating and said circular base defining an interface therebetween comprising a second surface from which incident light is to be reflected, whereby light reflected from said first and second surfaces produces linear interference fringes indicative of the particular wavelengths of light to which the reticle is exposed.

References Cited

UNITED STATES PATENTS

| 3,133,201 | 5/1964 | Rock | 250—236 |
| 3,010,362 | 11/1961 | Smith | 350—314 |

FOREIGN PATENTS

| 15,678 | 7/1913 | Great Britain. |

RALPH G. NILSON, *Primary Examiner.*

M. ABRAMSON, *Assistant Examiner.*